US011945085B2

(12) United States Patent
Ludwig et al.

(10) Patent No.: US 11,945,085 B2
(45) Date of Patent: Apr. 2, 2024

(54) HAND-HELD POWER TOOL

(71) Applicant: Hilti Aktiengesellschaft, Schaan (LI)

(72) Inventors: Manfred Ludwig, Landsberg (DE); Erwin Manschitz, Germering (DE); Josef Fünfer, Koenigsbrunn (DE)

(73) Assignee: Hilti Aktiengesellschaft, Schaan (LI)

(*) Notice: Subject to any disclaimer, the term of this patent is extended or adjusted under 35 U.S.C. 154(b) by 14 days.

(21) Appl. No.: 17/635,267

(22) PCT Filed: Sep. 3, 2020

(86) PCT No.: PCT/EP2020/074571
§ 371 (c)(1),
(2) Date: Feb. 14, 2022

(87) PCT Pub. No.: WO2021/043888
PCT Pub. Date: Mar. 11, 2021

(65) Prior Publication Data

US 2022/0288759 A1 Sep. 15, 2022

(30) Foreign Application Priority Data

Sep. 6, 2019 (EP) .................................... 19195892

(51) Int. Cl.
*B25D 11/06* (2006.01)
*B25D 11/12* (2006.01)
*B25D 16/00* (2006.01)

(52) U.S. Cl.
CPC ............ *B25D 16/00* (2013.01); *B25D 11/062* (2013.01); *B25D 11/125* (2013.01);
(Continued)

(58) Field of Classification Search
CPC .... B25D 11/062; B25D 11/125; B25D 16/00; B25D 2250/095; B25D 2250/175; B25D 2250/231; B25D 2250/331
See application file for complete search history.

(56) References Cited

U.S. PATENT DOCUMENTS 3,650,336 A * 3/1972 Koehler ............... B25D 16/003
173/110
8,261,850 B2 * 9/2012 Fuchs .................... B25D 17/00
173/90

(Continued)

FOREIGN PATENT DOCUMENTS

CH 673007 A5 * 10/1987 ............ B25D 16/00
DE 10 2006061625 A1 7/2008

(Continued)

OTHER PUBLICATIONS

International Search Report of PCT/EP2020/074571, dated Nov. 9, 2020.

*Primary Examiner* — Thomas M Wittenschlaeger
*Assistant Examiner* — David G Shutty
(74) *Attorney, Agent, or Firm* — Davidson, Davidson & Kappel, LLC

(57) ABSTRACT

A hand-held power tool, in particular a hammer drill or combination hammer, having a tool fitting for holding a striking and rotating tool on a working axis, an electric motor coupled to a transmission shaft, an impact mechanism, which has a striker that is moved periodically along the working axis, and having a rotary drive, which drives a guide tube carrying the tool fitting in rotation about the working axis, wherein the rotary drive is coupled to the transmission shaft via a rocker lever.

9 Claims, 5 Drawing Sheets

(52) U.S. Cl.
CPC .. *B25D 2250/095* (2013.01); *B25D 2250/175* (2013.01); *B25D 2250/231* (2013.01); *B25D 2250/331* (2013.01)

(56) References Cited

U.S. PATENT DOCUMENTS

| | | | | |
|---|---|---|---|---|
| 10,821,590 | B2 * | 11/2020 | Hartmann | B25D 11/005 |
| 2016/0107303 | A1 * | 4/2016 | Roberts | B25D 16/006<br>173/104 |
| 2017/0355070 | A1 * | 12/2017 | Ohlendorf | B25D 11/062 |

FOREIGN PATENT DOCUMENTS

| | | | | |
|---|---|---|---|---|
| DE | 102014101827 | A1 * | 8/2015 | B23B 41/04 |
| EP | 3181301 | A1 | 6/2017 | |
| EP | 3181302 | A1 * | 6/2017 | B23B 41/04 |
| EP | 3181302 | A1 | 6/2017 | |

* cited by examiner

A - A
B - B
SR
UZ
EX
DA
WA
RB
HA
HB
SA
x°
3
12
13
14
17
20
21
23
25
27
29
30
34
50
70

SR
30
13
29
23
x°
WA
3
12
25
B - B 27
20
DA
SR
23
30
12
WA
3

C
21
34
D
30
29
27
25
A - A
20
DA
12
23
13
3
B
B
70

UZ
HT
21
34
RB
17
14
13
50
3

FR
13
29
30
23
25
X°
3
12
B - B 27
20
DA
FR
23
30
12
WA
3

C
27
21
25
A - A
D
30
29
20
DA
B
12
B
VB
23
3
13
70

UZ
21
34
17
14
50
13
3

FR
13
29
30
12
25
x°
3
23
B - B 27
20
DA
FR
23
30
12
3
WA

C
27
21
25
34
D
30
29
A - A
DA
20
B
12
VB
23
70
3
13

UZ
21
17
34
50
14
13
3

HAND-HELD POWER TOOL

The present invention relates to a hand-held power tool having a tool fitting for holding a striking and rotating tool on a working axis. The hand-held power tool is equipped with an electric motor, which is coupled for its part to a transmission shaft, an impact mechanism, which has a striker that is movable periodically along the working axis, and having a rotary drive, which drives a guide tube carrying the tool fitting in rotation about the working axis.

BACKGROUND

Such a hand-held power tool, which can be in the form for example of a hammer drill, is known from EP 3 181 301 A2.

SUMMARY OF THE INVENTION

An object of the present invention is to provide a hand-held power tool, in particular a hammer drill or combination hammer, having a comparatively compact and robust rotary drive.

The present invention provides that the rotary drive is coupled to the transmission shaft via a rocker lever.

The invention incorporates the finding that when the drilling tool (striking and rotating tool) is varied, different drill bit diameters or drill bit types sometimes require a slower rotational speed of the tool fitting for the best possible drilling performance. This makes a step-down gear mechanism with a comparatively stronger reducing action necessary, this—at least in the hand-held power tools of the prior art—disadvantageously increasing the space requirement, the costs, the number of components, the complexity and the weight of these tools.

In the hand-held power tool according to the invention, which can be in the form of a hammer drill or combination hammer, use is made of a rocker lever. This is instead of spur gears and/or bevel gears, which are exclusively or at least predominantly used in hand-held power tools of the prior art. As a result, a comparatively compact and robust rotary drive can be provided.

In a particularly preferred configuration, the rocker lever is coupled to the transmission shaft via an eccentric bearing. The transmission shaft may be different than a rotor shaft of the electric motor. The transmission shaft may be coupled to the rotor shaft in a rotatable manner via a gearwheel pair. Alternatively, the transmission shaft may itself be the rotor shaft of the electric motor.

In a further particularly preferred configuration, the rotary drive has a swivel sleeve which is arranged coaxially with the guide tube and by means of which the guide tube can be rotated about the working axis. It has been found to be advantageous for the swivel sleeve to have a peg, which is mounted in a joint bearing of the rocker lever.

In a particularly preferred configuration, the rotary drive has a freewheel sleeve which is arranged coaxially with the guide tube and allows a torque to be transmitted from the swivel sleeve to the guide tube only in a blocking direction. The freewheel sleeve may be in the form of a force-fitting freewheel or of a form-fitting freewheel. The freewheel sleeve may have been pressed into the swivel sleeve. In a particularly preferred configuration, the freewheel sleeve is mounted in or on the guide tube.

It has been found to be advantageous for an axis of rotation of the rocker lever to extend parallel to the transmission shaft. The axis of rotation of the rocker lever may lie between the eccentric bearing and the joint bearing.

In a particularly preferred configuration, the impact mechanism has a transmission component for converting the rotary movement of the transmission shaft into a periodic movement in translation parallel to the working axis. The transmission component may have an impact-mechanism eccentric wheel or a wobble plate, which is formed preferably integrally with the transmission shaft. In a further particularly preferred configuration, the eccentric bearing is assigned a rotary-drive eccentric wheel, which is formed preferably integrally with the transmission shaft.

It has been found to be advantageous for the impact mechanism to have an exciter piston connected to the transmission component, and a pneumatic chamber, wherein the striker is coupled to the exciter piston via the pneumatic chamber. The rotary drive and the impact mechanism may be coupled to the transmission shaft such that an advancing movement of the exciter piston takes place in a phase-shifted manner with respect to a torque transmission via the swivel sleeve.

Further advantages will become apparent from the following description of the figures. Various exemplary embodiments of the present invention are shown in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
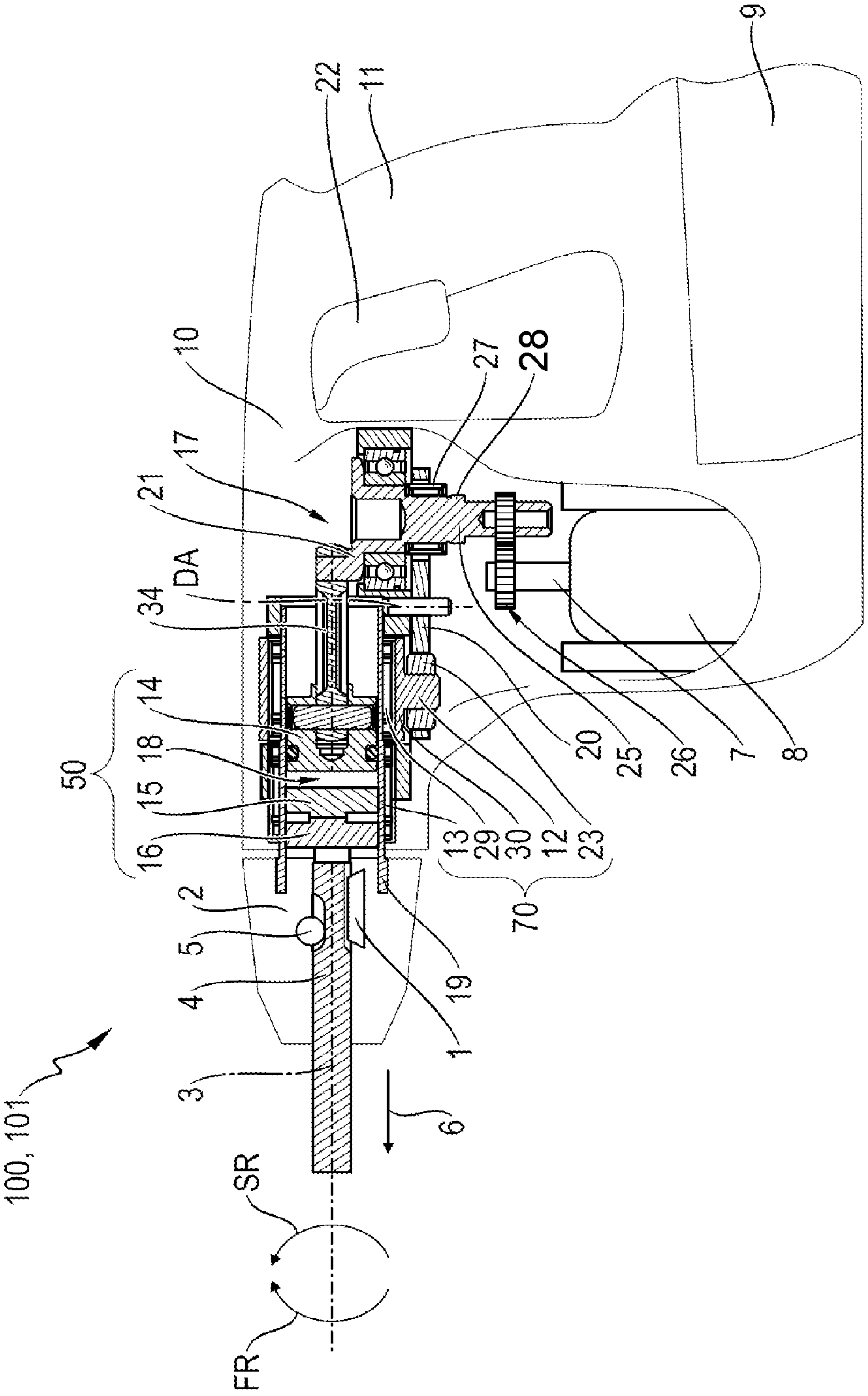
FIG. 1 shows a first preferred exemplary embodiment of a hand-held power tool according to the invention.

A preferred exemplary embodiment of a hand-held power tool 100 according to the invention is illustrated in FIG. 1. FIG. 1 shows a hammer drill 101 as an example of a percussive portable hand-held power tool 100. The hammer drill 101 has a tool fitting 2, into which a drill bit, chisel or other striking tool 4 can be inserted and locked in place coaxially with a working axis 3. The hammer drill 101 has a pneumatic impact mechanism 50, which can periodically exert blows in a striking direction 6 on the tool 4. A rotary drive 70 can rotate the tool fitting 2 continuously about the working axis 3. The pneumatic impact mechanism 50 and the rotary drive are driven by an electric motor 8, which is fed with electric current by a rechargeable battery 9 or a power cord.

The impact mechanism 50 and the rotary drive 70 are arranged in a machine housing 10. A handle 11 is typically arranged on a side of the machine housing 10 that faces away from the tool fitting 2. The user can hold and guide the hammer drill 101 by means of the handle 11 during operation. An additional auxiliary handle can be fastened close to the tool fitting 2. Arranged on or in the vicinity of the handle 11 is an operating button 22, which the user can actuate preferably with the holding hand. The electric motor 8 is switched on by the actuation of the operating button 22. Typically, the electric motor 8 rotates for as long as the operating button 22 is kept pressed. The electric motor 8 has a rotor shaft 7 and is connected to a transmission shaft 25 of the hand-held power tool 100 via a gearwheel pair 26 (in this case for example with spur gears).

The tool 4 is movable along the working axis 3 in the tool fitting 2. For example, the tool 4 has an elongate groove, in which a ball 5 or some other blocking body of the tool fitting 2 engages. The user holds the tool 4 in a working position in that the user presses the tool 4 indirectly against a substrate by way of the hammer drill 101. The tool fitting 2 is fastened to a spindle 19, which, in the exemplary embodiment shown, forms an extension of the guide tube 13 of the rotary drive 70. In all exemplary embodiments, the spindle 19 and the guide tube 13 can be formed integrally with one another. Alternatively, the spindle 19 and the guide tube 13 can be formed as separate components. The tool fitting 2 can rotate about the working axis 3 with respect to the machine housing 10. At least one claw 1 or other suitable means in the tool fitting 2 transmits a torque from the tool fitting 2 to the tool 4.

According to the invention, the hand-held power tool 100 has a rocker lever 20, via which the rotary drive 70 is coupled to the transmission shaft 25. In the preferred exemplary embodiment in FIG. 1, the rocker lever 20 is coupled to the transmission shaft 25 via an eccentric bearing 27. For its part, the transmission shaft 25 has a rotary-drive eccentric wheel 28 (cf. FIG. 2). The rotary-drive eccentric wheel 28 is formed integrally with the transmission shaft 25.

The rotary drive 70 furthermore has a swivel sleeve 30 which is arranged coaxially with the guide tube 13 and by means of which the guide tube 13 can be rotated about the working axis 3. The swivel sleeve 30 is equipped with a peg 12, which is mounted in a joint bearing 23 of the rocker lever 20. As can be gathered from FIG. 1, the rotary drive 70 has a freewheel sleeve 29 arranged coaxially with the guide tube 13. The freewheel sleeve 29 allows a torque to be transmitted from the swivel sleeve 30 to the guide tube 13 only in a blocking direction SR. In a freewheeling direction FR, no torque or only an extremely low torque is transmitted from the swivel sleeve 30 to the guide tube 13. In the freewheeling direction FR, the freewheel sleeve 29 acts as a simple rolling bearing. An axis of rotation DA of the rocker lever 20 lies parallel to the transmission shaft 25 and extends between the eccentric bearing 27 and the joint bearing 23.

The pneumatic impact mechanism 50 has, in the striking direction 6, an exciter piston 14, a striker 15 and an anvil 16. The exciter piston 14 is forced to execute a periodic movement along the working axis 3 by means of the electric motor 8. The exciter piston 14 is attached via a transmission component 17 for converting the rotary movement of the electric motor 8 into a periodic movement in translation along the working axis 3. An example of a transmission component 17 contains an impact-mechanism eccentric wheel 21 with an attached connecting rod 34. A period of the movement in translation of the exciter piston 14 is defined by the rotational speed of the electric motor 8 and optionally by a reduction ratio in the transmission component 17. In the exemplary embodiment illustrated here, the impact-mechanism eccentric wheel 21 is formed integrally with the transmission shaft 25.

The striker 15 couples to the movement of the exciter piston 14 via a pneumatic spring. The pneumatic spring is formed by a pneumatic chamber 18 closed off between the exciter piston 14 and the striker 15. The striker 15 moves in the striking direction 6 until the striker 15 strikes the anvil 16. The anvil 16 bears against the tool 4 in the striking direction 6 and transmits the impact to the tool 4. The period of the movement of the striker 15 is identical to the period of the movement of the exciter piston 14. The striker 15 thus strikes with a striking rate that is identical to the inverse of the period. The optimal striking rate is defined by the mass of the striker 15 and the geometric dimensions of the pneumatic chamber 18. An optimal striking rate may lie in the range between 25 Hz and 100 Hz.

The example of an impact mechanism 50 has a piston-like exciter piston 14 and a piston-like striker 15, which are guided along the working axis 3 by a guide tube 13. The exciter piston 14 and the striker 15 bear with their lateral surfaces against the inner surface of the guide tube 13. The pneumatic chamber 18 is closed off along the working axis 3 by the exciter piston 14 and the striker 15 and in a radial direction by the guide tube 13. Sealing rings in the lateral surfaces of the exciter piston 14 and striker 15 can improve the airtight closing off of the pneumatic chamber 18.

The rotary drive 70 contains the guide tube 13, which is arranged coaxially with the working axis 3. The guide tube 13 is for example hollow, and the impact mechanism 50 is arranged within the guide tube. The tool fitting 2 is fitted on the spindle 19, which in this case by way of example, as mentioned above, forms an extension of the guide tube 13. The tool fitting 2 can be connected releasably or permanently to the guide tube 13 via a closing mechanism. The guide tube 13 is attached to the electric motor 8 via the step-down eccentric transmission 20, to be more precise via the transmission shaft 25 thereof. The rotational speed of the guide tube 13 is lower than the rotational speed of the electric motor 8.

The sequence of movements of the rotary drive coupled to the transmission shaft 25 via the rocker lever 20 will now be described in more detail with reference to FIGS. 2*a*, 2*b*, 2*c*, 2*d*, 3*a*, 3*b*, 3*c*, 3*d*, 4*a*, 4*b*, 4*c*, 4*d*, 5*a*, 5*b*, 5*v*, and 5*d*. Therein, the a) figures of each number each show a vertical section through the arrangement (analogously to FIG. 1). The b) figures of each number each show a view of the rocker lever 20 "from below". The c) figures of each number each illustrate a horizontal section (section C) through the connecting rod 34. Finally, the d) figures of each number show a vertical section from the direction of the tool fitting (section line B-B).

The rocker lever 20 coupled to the transmission shaft 25 can be seen in all the figures. The rocker lever 20 is to the transmission shaft 25 via an eccentric bearing 27. The rotary drive 70 has a swivel sleeve 30 which is arranged coaxially with the guide tube 13 and by means of which the guide tube 13 can be rotated about the working axis 3. The swivel sleeve 30 has a peg 12, which is mounted in a joint bearing 23 of the rocker lever 20. A freewheel sleeve 29 arranged coaxially with the guide tube 13 allows a torque to be transmitted from the swivel sleeve 30 to the guide tube 13 only in a blocking direction SR. An axis of rotation DA of the rocker lever 20 is oriented parallel to the transmission shaft 25 and lies between the eccentric bearing 27 and the joint bearing 23. An eccentric wheel 21, which is driven in the clockwise direction UZ by an electric motor that is not illustrated here (cf. FIG. 2*c*), is coupled via a connecting rod 34 to an exciter piston 14 (as part of the impact mechanism 50 that is not fully illustrated here).

Figures 2A, 2B, 2C, 2D:
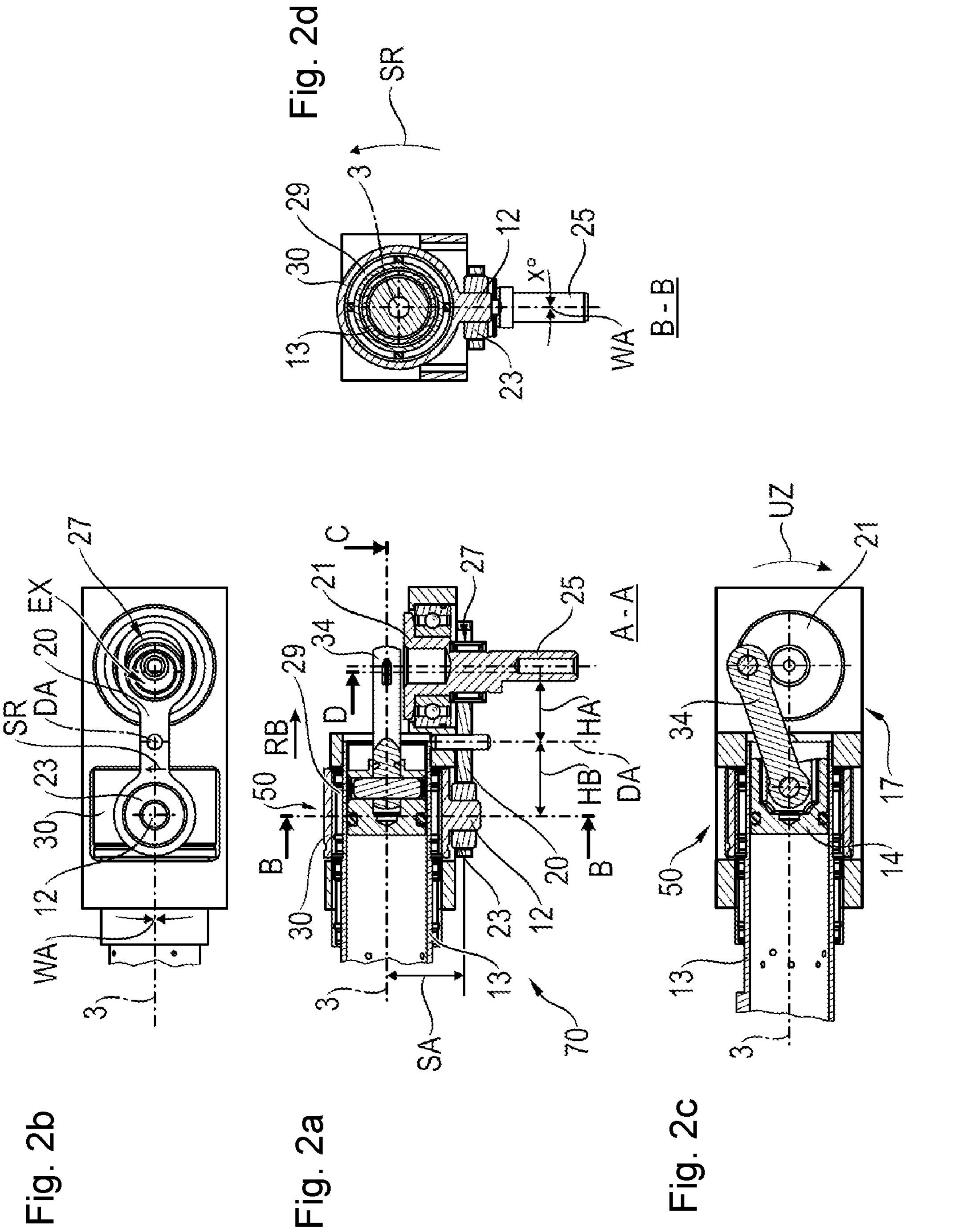
FIGS. 2*a*, 2*b*, 2*c* and 2*d* show a first movement state of the rotary drive having a rocker lever.
Figures 3A, 3B, 3C, 3D:
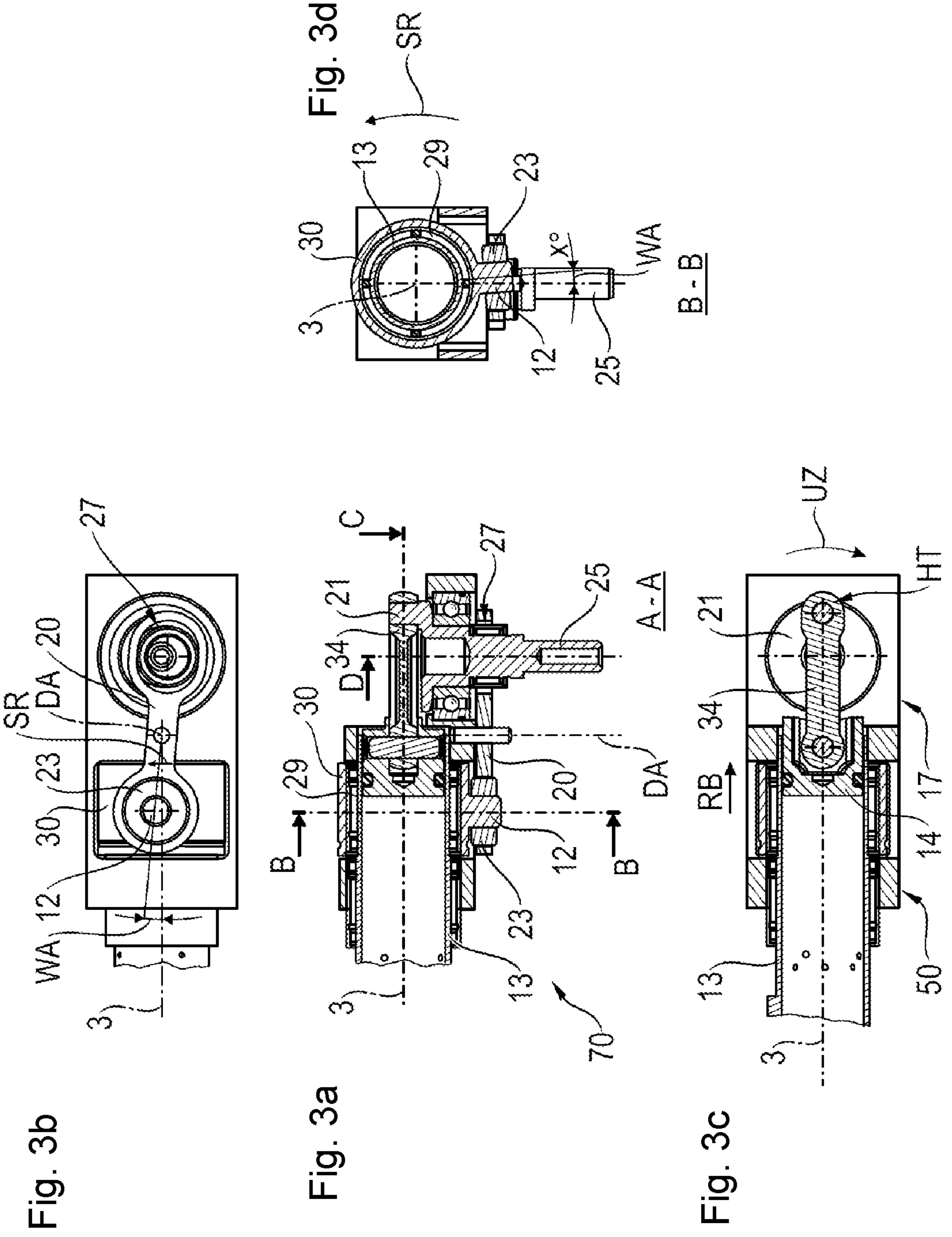
FIGS. 3*a*, 3*b*, 3*c* and 3*d* show a second movement state of the rotary drive having a rocker lever.
Figures 4A, 4B, 4C, 4D:
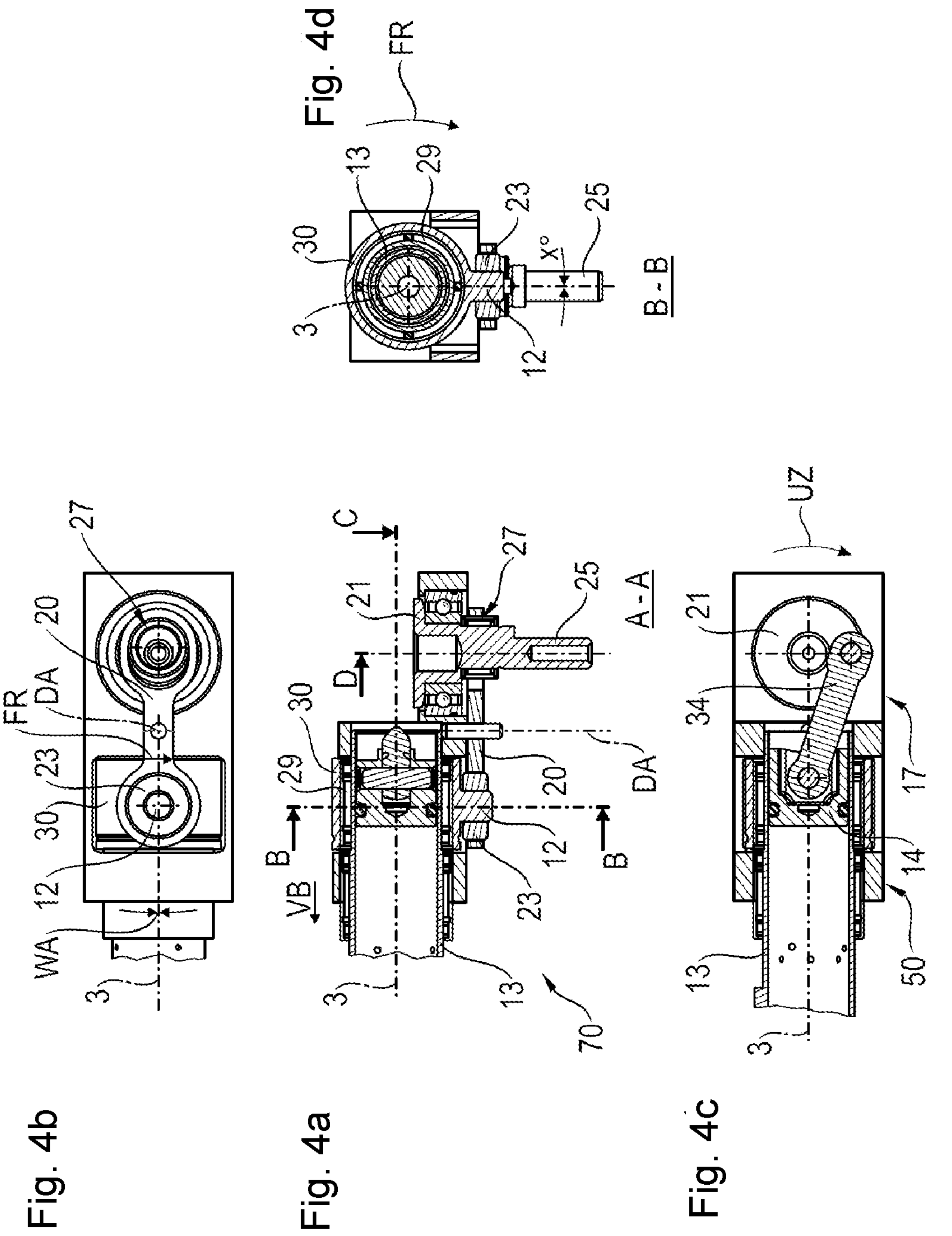
FIGS. 4*a*, 4*b*, 4*c* and 4*d* show a third movement state of the rotary drive having a rocker lever.
Figures 5A, 5B, 5C, 5D:
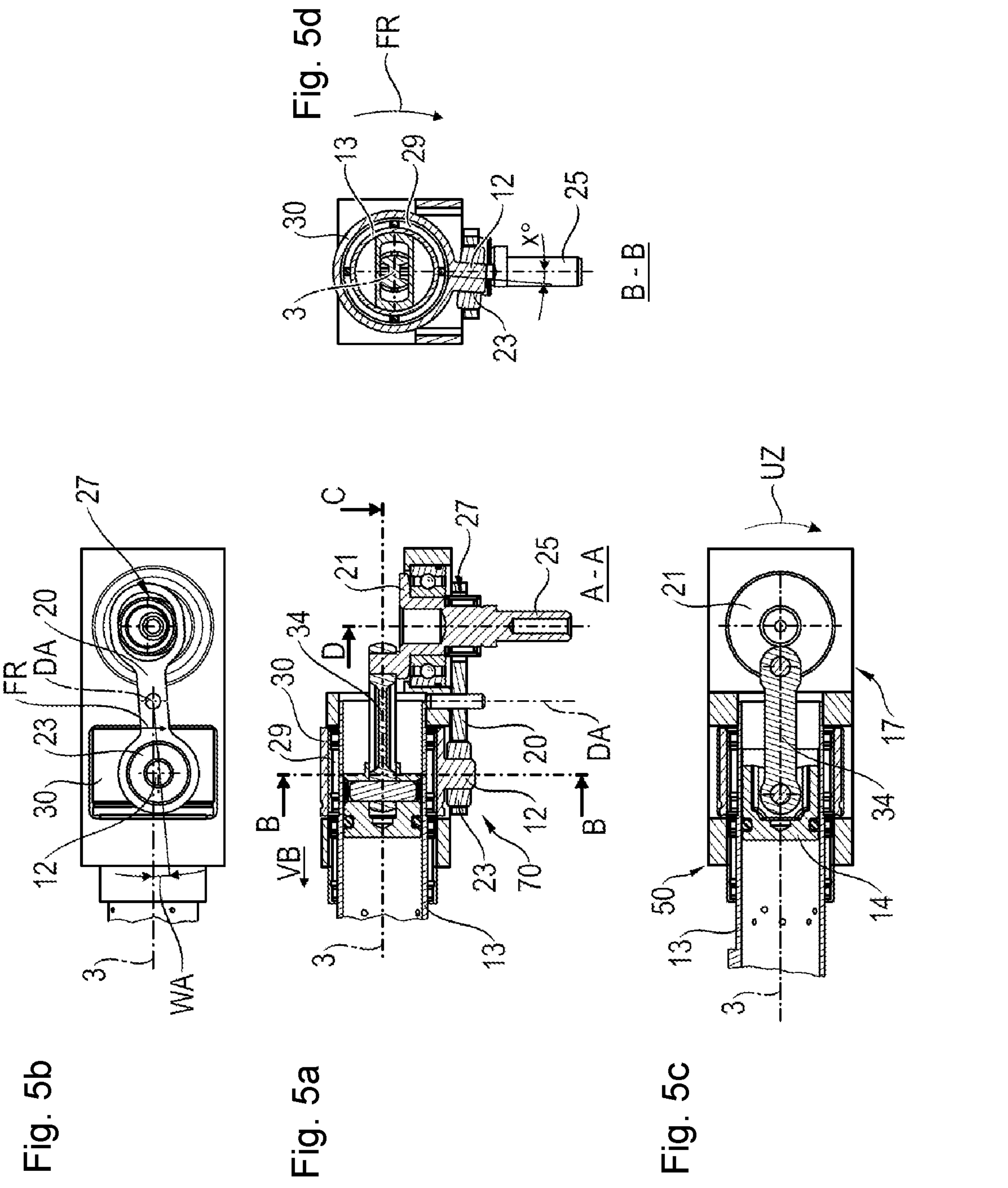
FIGS. 5*a*, 5*b*, 5*c* and 5*d* show a fourth movement state of the rotary drive having a rocker lever.

Illustrated first of all in FIG. 2*a* is a return movement RB (oriented to the right in FIG. 2*a*) of the exciter piston 14, which is used to drive the guide tube 13. In the process, the rocker lever 20 in the region of the joint bearing 23 and the swivel sleeve 30 execute an angular rotation WA in the blocking direction SR (upwardly in FIG. 2*a*), wherein the freewheel sleeve 29 blocks in a manner coupled to the swivel sleeve 30, with the result that a torque is transmitted to the guide tube 13. The angular rotation WA is defined via the eccentricity EX (cf. FIG. 2*b*), the lever ratio between the first lever arm HA and the second lever arm HB (cf. FIG. 2*a*), and the swivel distance SA (cf. FIG. 2*a*).

In FIGS. 3*a*, 3*b*, 3*c* and 3*d*, which temporally follow FIGS. 2*a*, 2*b*, 2*c*, 2*d*, the return movement RB of the exciter piston 14 has been completed, meaning that the exciter piston 14 is located in a rear dead-center position HT. The transmission of torque to the guide tube 13 has been concluded. The peg 12 of the swivel sleeve 30 has been deflected—compared with the state shown in FIGS. 2*a*, 2*b*, 2*c*, 2*d*—in the blocking direction SR.

In FIGS. 4*a*, 4*b*, 4*c*, 4*d*, which temporally follow FIGS. 3*a*, 3*b*, 3*c*, 3*d*, an advancing movement VB of the exciter piston 14 is illustrated, meaning that an impact-mechanism pressure is generated by the exciter piston 14. In the process, the rocker lever 20 in the region of the joint bearing 23 and the swivel sleeve 30 execute an angular rotation WA in the freewheeling direction FR (downwardly in FIG. 4*a*), with the result that the swiveling movement of the swivel sleeve 30 is carried out in a torque-free manner, meaning that the freewheel sleeve acts like a rolling bearing (blocking eliminated) and there is no rotation of the guide tube 13.

In FIGS. 5*a*, 5*b*, 5*c*, 5*d*, which temporally follow FIGS. 4*a*, 4*b*, 4*c*, 4*d*, the advancing movement VB of the exciter piston 14 has been completed. "Free rotation" of the freewheel sleeve 30 has been concluded. The exciter piston 14 is in a front dead-center position VT. The peg 12 of the swivel sleeve 30 has been deflected—compared with the state shown in FIG. 4—in the freewheeling direction FR. During operation of the hand-held power tool, the state shown in FIG. 2 would now follow the state shown in FIG. 5, meaning that a new return movement RB of the exciter piston 14 takes place.

It is clear from viewing FIG. 2*a* through FIG. 5*d* in combination that the rotary drive 70 and the impact mechanism 50 are coupled to the transmission shaft 25 such that the advancing movement VB of the exciter piston 14 takes place in a phase-shifted manner with respect to a torque transmission via the swivel sleeve 30. During the advancing movement VB, pressure is generated in the impact mechanism 50, meaning increased power consumption by the electric motor. During this movement, there is no torque on the freewheel sleeve 30. During the return movement RB, the impact mechanism 50 is relieved of load and the drive output of the electric motor is advantageously used for torque transmission, wherein the freewheel sleeve 29 blocks.

LIST OF REFERENCE SIGNS

1 Claw
2 Tool fitting
3 Working axis
4 Striking tool
5 Ball
6 Striking direction
7 Rotor shaft
8 Electric motor
9 Rechargeable battery
10 Machine housing
11 Handle
12 Peg
13 Guide tube
14 Exciter piston
15 Striker
16 Anvil
17 Transmission component
18 Pneumatic chamber
19 Spindle
20 Rocker lever
21 Impact-mechanism eccentric wheel
22 Operating button
23 Joint bearing
25 Transmission shaft
26 Gearwheel pair
27 Eccentric bearing
28 Rotary-drive eccentric wheel
29 Freewheel sleeve
30 Swivel sleeve
31 Peg
34 Connecting rod
50 Impact mechanism
70 Rotary drive
100 Hand-held power tool
101 Hammer drill
DA Axis of rotation
EX Eccentricity
FR Freewheeling direction
HA First lever arm
HB Second lever arm
HT Rear dead-center position
RB Return movement
SA Swivel distance
SR Blocking direction
UZ Clockwise direction
VB Advancing movement
VT Front dead-center position
WA Angular rotation

What is claimed is:

1. A hand-held power tool comprising:
a tool fitting for holding a striking and rotating tool on a working axis;
an electric motor coupled to a transmission shaft;
an impact mechanism having a striker movable periodically along the working axis; and
a rotary drive drives a guide tube carrying the tool fitting in rotation about the working axis, the rotary drive being coupled to the transmission shaft via a rocker lever;
wherein the impact mechanism has a transmission component for converting the rotary movement of the transmission shaft into a periodic movement in translation parallel to the working axis; wherein the impact mechanism has an exciter piston connected to the transmission component, and a pneumatic chamber, wherein the striker is coupled to the exciter piston via the pneumatic chamber; and wherein the rotary drive and the impact mechanism are coupled to the transmission shaft such that an advancing movement of the exciter piston takes place in a phase-shifted manner with respect to a torque transmission via a swivel sleeve.

2. The hand-held power tool as recited in claim 1 wherein the rocker lever is coupled to the transmission shaft via an eccentric bearing.

3. The hand-held power tool as recited in claim 1 wherein the rotary drive has a swivel sleeve arranged coaxially with the guide tube, the guide tube rotatable about the working axis via the swivel sleeve, the swivel sleeve having a peg mounted in a joint bearing of the rocker lever.

4. The hand-held power tool as recited in claim 3 wherein the rotary drive has a freewheel sleeve arranged coaxially with the guide tube and allowing a torque to be transmitted from the swivel sleeve to the guide tube only in a direction opposite a freewheeling direction.

5. The hand-held power tool as recited in claim 3 wherein an axis of rotation of the rocker lever extends parallel to the transmission shaft.

6. The hand-held power tool as recited in claim 3 wherein an axis of rotation of the rocker lever lies between an eccentric bearing and the joint bearing.

7. The hand-held power tool as recited in claim 1 wherein the transmission component has an impact-mechanism eccentric wheel or a wobble plate.

8. The hand-held power tool as recited in claim 2 wherein the eccentric bearing is assigned a rotary-drive eccentric wheel.

9. The hand-held power tool as recited in claim 8 wherein the rotary-drive eccentric wheel is formed integrally with the transmission shaft.

* * * * *